Nov. 15, 1949 R. E. RILEY Re. 23,167
SHOULDER PAD
Original Filed Nov. 19, 1945
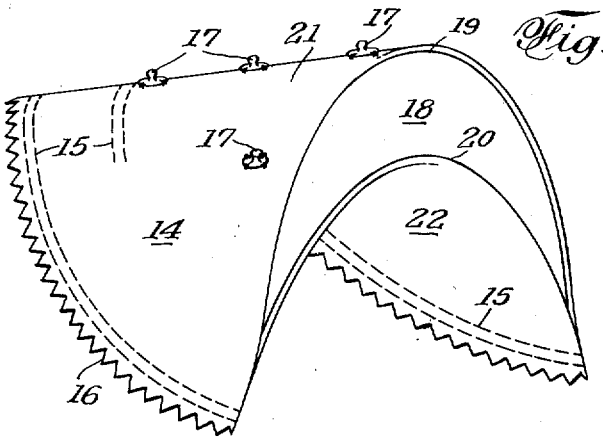
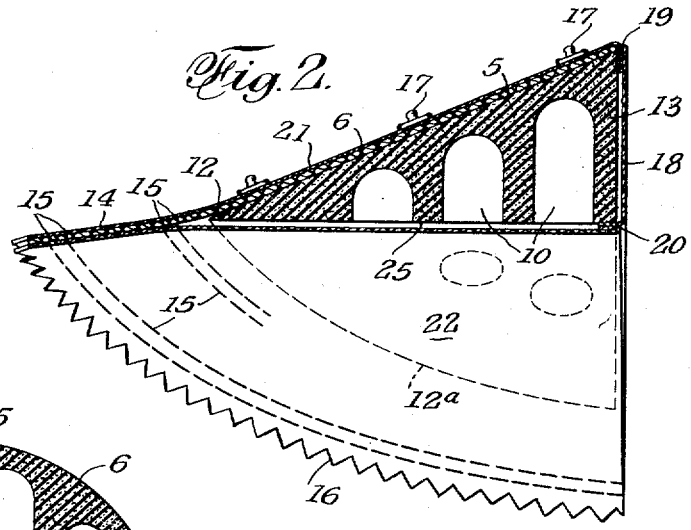
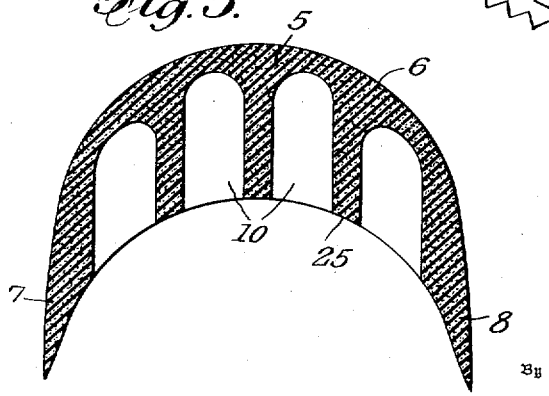
Inventor
RUTH E. RILEY
By C. G. Stratton
Attorney Reissued Nov. 15, 1949

Re. 23,167

UNITED STATES PATENT OFFICE 23,167

SHOULDER PAD

Ruth E. Riley, Los Angeles, Calif.

Original No. 2,465,120, dated March 22, 1949, Serial No. 629,624, November 19, 1945. Application for reissue May 25, 1949, Serial No. 95,321

20 Claims. (Cl. 2—268)

My invention relates to a shoulder pad. An important object of the invention is to provide a shoulder pad of cushion rubber, sponge rubber or what is known in the trade as "Airfoam" rubber, or any similar product.

Another object is to provide an unbroken upper surface but to provide a plurality of recesses on the lower side in order to lighten same.

Still another object of the invention is to provide an easily removable shoulder pad, whereby it can be placed in other garments and in order that the garment and the pad may be separately laundered.

A still further object is to provide means to soften the edge of the shoulder pad so that there may not be a sharp line of demarcation around the pad.

My invention also has for its objects to provide such means that are positive in operation, convenient in use, easily installed in a working position and easily disconnected therefrom, economical of manufacture, relatively simple, and of general superiority and serviceability.

My invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a perspective view of a shoulder pad, embodying the features of my invention.

Fig. 2 is a somewhat enlarged, longitudinal section through said embodiment.

Fig. 3 is a transverse sectional view, showing the covering material removed.

The body of the pad 5 comprises a porous, light-weight and resilient element. Examples of suitable molded materials of which the pad is made are cushion rubber, sponge rubber, what is known in the art as "Airfoam" rubber, or any similar product.

Said body 5 is formed to have a generally isosceles triangular shape in plan, the base of said triangular shape comprising the outer end 13 of the body as worn on the shoulder, and the apex, the inner end 12 of the body.

The body 5 has a transversely and convexly curved upper surface 6 and a transversely and concavely curved inner surface 25, the former supporting the garment and the latter engaging over the shoulder of the wearer of said garment.

The longitudinal cross-section of the body is triangular or wedge-shaped, the triangle formed by said section consisting of end 13 as the base, surfaces 6 and 25 as the sides, and end 12 as the apex opposite base 13.

The convex and concave surfaces 6 and 25, respectively define a crescent-shaped form that is the shape of end 13, said form, from end 13 toward end 12, retaining its crescent shape and gradually diminishing in both width and thickness. Accordingly, the inner end 12 tapers to a relatively thin edge 12a which, together with end 13, constitutes the isosceles triangular shape of the body, while the outer and thicker end 13 provides the lift for the shoulder. The body 5, therefore, has a wedge-shaped longitudinal section and has depending portions 7 and 8 at the sides to embrace the front and back of the shoulder of the wearer.

The under side 25 of the pad has a plurality of substantially parallel recesses or voids 10. These recesses are preferably arranged substantially parallel rather than radiating from a common center, in order to cut out a maximum of the material, for lightening purposes.

The rubber pad is preferably covered with fabric material. Stitched pieces of fabric or felted material may be folded around the rubber pad, covering all sides thereof. The material is preferably of sufficient size that it can overlap upon itself, as shown at 14. These overlapping portions 14 are stitched together at 15. The edge 16 of the material may be pinked, if desired. A crescent-shaped end part 18 of the covering is sewn along the upper and lower edges 19 and 20 to the top side 21 and to the under side 22, respectively, of the covering. This arrangement provides a snug fit for the covering on the body member.

Snap elements 17 are arranged along the top and sides of my present pad. Therewith cooperating snap elements may be sewn to the garment in which my pads are placed. By reason of this snap connection, my pads may be easily removed for laundering or replacement.

The use of my shoulder pads is believed clear from the foregoing. They are used to build up the shoulders of garments. The shape thereof can, of course, vary, depending upon the current style, without departing from the idea of the light-weight, porous rubber material having relatively large voids as well as small ones, or may be made entirely of porous rubber.

It is to be understood that in this specification and in the hereto appended claims, the word "rubber" shall be interpreted to include both synthetic and natural rubber, and "cloth" shall be interpreted to include both fabric and felted material.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a shoulder pad, a porous, light-weight, rubber body member of wedge shape in longitudinal section and having depending portions at the sides thereof to embrace the front and back of the shoulder, the body member having longitudinally and transversely dispersed, relatively large, substantially parallel voids extending upwardly from the bottom thereof to points short of the upper surface thereof and arranged between the sides thereof, and a covering enveloping the body member and extending smoothly over and beyond the tapered edge of the body member to soften the appearance thereof in a garment.

2. In a shoulder pad, a cross-sectionally wedge-shaped body of resilient material having a convex outline and side portions adapted to overlap the front and back of the shoulder, said body having a plurality of vertical, spaced members depending from the top thereof and providing resilient supports for the body, said members being graduated in length from the thinnest portion of the wedge body to the thickest portion thereof, and a cover for said body.

3. A shoulder pad comprising a body of resilient material having side portions adapted to overlap the front and back of a shoulder, said body having a plurality of vertical, spaced, resilient legs depending from the top thereof and providing a support for the body, said legs varying in length from one end of the body to the other, and the lower free ends of said legs being curvilinear to conform to the contour of a shoulder, and a cover for said body.

4. A shoulder pad comprising a hollow unitary member of light, resilient material, resistant to heat and cleaning chemicals, generally of isosceles triangular shape in plan, concavely curved on its lower surface and convexly curved on the upper surface thereof, the interior of the pad being hollowed and having a plurality of spaced stiffening ribs extending from the underside of the upper surface to the plane of the lower surface, the height of the stiffening ribs decreasing progressively from the base end of the triangular plan to the apex end thereof.

5. A shoulder pad comprising a hollow unitary member of light, resilient material, resistant to heat and cleaning chemicals, generally of isosceles triangular shape in plan, concavely curved on its lower surface and convexly curved on the upper surface thereof, the interior of the pad being hollowed and having a plurality of spaced stiffening ribs extending from the underside of the upper surface to the plane of the lower surface, the height of the stiffening ribs decreasing progressively from the base end of the triangular plan to the apex end thereof, in which the ribs are spaced apart as to provide four sided openings to the interior of the pad.

6. A shoulder pad comprising a hollow unitary member of light, resilient material resistant to the action of heat and cleaning chemicals, which pad is generally of isosceles triangular shape in plan, the base of the triangle being adapted to overlie the outer end of the shoulder and the apex end thereof being adapted to overlie the inner end of the shoulder, the upper surface of the pad being convexly curved and the under surface thereof being concavely curved, the interior of the pad being hollow, and the degree of curvature of the upper and lower surfaces decreasing from the base end towards the apex end thereof, and having a plurality of widely spaced apart integral stiffening ribs inside the pad, the height thereof decreasing from the base towards the apex end thereof.

7. A shoulder pad comprising a hollow unitary member of light, resilient material, convexly curved on its upper surface and concavely curved on the lower surface, with a plurality of spaced apart rib members extending from the underside of said upper surface for contact with the shoulder of a wearer, the rib members varying in height to conform to the contour of wearer's shoulder.

8. In a shoulder pad, a porous, light-weight and integral resilient body member substantially wedge-shaped in longitudinal section and having depending portions at the sides thereof, the body member having voids extending upwardly at either side of a midportion of the underside of the body member.

9. In a shoulder pad, a porous, light-weight and integral resilient body member substantially wedge-shaped in longitudinal section and having depending portions at the sides thereof, the body member having voids extending upwardly at either side of a mid-portion of the underside of the body member, the said mid-portion tapering lengthwise toward the thinnest portion of the wedge-shaped body member.

10. In a shoulder pad, a light-weight, and integral resilient body member substantially wedge-shaped in longitudinal section and having depending portions at the sides thereof, the body member having a plurality of recesses extending upwardly from the underside thereof, to lighten same.

11. A shoulder pad comprising a porous, light-weight resilient member having a shape, in plan, that is substantially an isosceles triangle, said member being transversely curved and having a crescent-shaped end at the base of said triangle, said member, from said crescent-shaped end, gradually tapering toward the apex of said triangle, the pad, within its peripheral edges, having at least one recess in its under surface to lighten the same.

12. A shoulder pad comprising a porous, light-weight resilient member having a shape in plan that is substantially an isosceles triangle, said member having a transversely and convexly curved upper surface and a transversely and concavely curved lower surface, whereby the end that constitutes the base of said triangle is crescent-shaped, said member, from the crescent-shaped end, gradually diminishing in size and thickness toward the apex of said triangle, the pad, within its peripheral edges, having at least one recess in its under surface to lighten the same.

13. A shoulder pad comprising a molded body member of resilient, light-weight porous rubber, convexly curved on the upper surface and concavely curved on the lower surface, and having a relatively thick end portion with the top and bottom surfaces tapering longitudinally to an intersecting edge, to provide a substantially wedge-shaped pad, and the body having substantially identical front and back portions depending the same amount and tapering transversely toward front and back edge portions and arranged to overlap the front and back of the shoulder of a wearer, the substantially identical portions permitting reversibility of the pad to be used on either shoulder of the wearer.

14. A shoulder pad comprising a body member made of sponge rubber material, convexly curved on the upper surface and concavely curved on the lower surface, and having a relatively thick end portion with the top and bottom surfaces tapering longitudinally to a relatively thin edge, to provide a substantially wedge-shaped pad, the body having front and back depending portions tapering transversely toward front and back edge portions and arranged to overlap the front and back of the shoulder of the wearer.

15. A shoulder pad comprising a body member made of resilient material, convexly curved on the upper surface and concavely curved on the lower surface and having a relatively thick end portion with top and bottom surfaces tapering longitudinally to a relatively thin edge, to provide a substantially wedge-shaped pad, the body having front and back depending portions extending between front and back edge portions and arranged to overlap the front and back of the shoulder of the wearer.

16. A shoulder pad comprising a body member made of flexible material, convexly curved on the upper surface and concavely curved on the lower surface and having a relatively thick end portion with top and bottom surfaces tapering longitudinally to a relatively thin edge, to provide a substantially wedge-shaped pad, the body having front and back depending portions extending between front and back edge portions and arranged to overlap the front and back of the shoulder of the wearer.

17. In a shoulder pad as set forth in claim 10, provided with snap elements to detachably secure the pad to a garment.

18. In a shoulder pad as set forth in claim 16, provided with snap elements to detachably secure the pad to a garment.

19. In a shoulder pad as set forth in claim 10, provided with a cover enclosing the pad and snap elements attached to the cover to detachably secure the pad to a garment.

20. In a shoulder pad as set forth in claim 16, provided with a cover enclosing the pad and snap elements attached to the cover to detachably secure the pad to a garment.

RUTH E. RILEY.

REFERENCES CITED

The following references are of record in the file of this patent:

UNITED STATES PATENTS

| Number | Name | Date |
|---|---|---|
| 621,811 | Goldman | Mar. 28, 1899 |
| 641,526 | Lowenthal | Jan. 16, 1900 |
| 2,110,951 | Frais | Mar. 15, 1938 |
| 2,408,840 | Friedman | Oct. 8, 1946 |

FOREIGN PATENTS

| Number | Country | Date |
|---|---|---|
| 542,687 | Great Britain | Jan. 23, 1942 |